US007111817B2

(12) United States Patent
Teti et al.

(10) Patent No.: US 7,111,817 B2
(45) Date of Patent: Sep. 26, 2006

(54) MUNICIPAL WATER DELIVERY CONTROL SYSTEMS

(75) Inventors: Robert Teti, 92 Sylwood Crese, Vaughan, Ontario (CA) L6A 2P7; Dylan Horvath, Toronto (CA)

(73) Assignee: Robert Teti, (CA)

( * ) Notice: Subject to any disclaimer, the term of this patent is extended or adjusted under 35 U.S.C. 154(b) by 2 days.

(21) Appl. No.: 10/896,451

(22) Filed: Jul. 22, 2004

(65) Prior Publication Data

US 2005/0067595 A1    Mar. 31, 2005

Related U.S. Application Data

(60) Provisional application No. 60/525,752, filed on Nov. 28, 2003, provisional application No. 60/492,211, filed on Aug. 1, 2003.

(51) Int. Cl.
*F16K 31/02* (2006.01)

(52) U.S. Cl. .............................. 251/129.04; 251/129.11; 700/282

(58) Field of Classification Search ........... 251/129.04, 251/129.11; 700/282
See application file for complete search history.

(56) References Cited

U.S. PATENT DOCUMENTS

| | | | |
|---|---|---|---|
| 3,839,662 A * | 10/1974 | N'Guyen | ..................... 318/160 |
| 4,062,376 A | 12/1977 | McGrath | |
| 4,180,088 A | 12/1979 | Mallett | |
| 4,298,946 A | 11/1981 | Hartsell et al. | |
| 4,386,649 A | 6/1983 | Hines et al. | |
| 4,549,160 A | 10/1985 | McGhee | |
| 4,700,886 A | 10/1987 | McGhee et al. | |
| 4,799,176 A | 1/1989 | Cacciatore | |
| 4,872,828 A | 10/1989 | Mierzwinski et al. | |
| 4,930,934 A | 6/1990 | Adkins | |
| 5,181,653 A | 1/1993 | Foster et al. | |
| 5,219,119 A | 6/1993 | Kasper et al. | |
| 5,220,937 A | 6/1993 | Roberts et al. | |
| 5,314,004 A | 5/1994 | Strand et al. | |
| 5,361,982 A | 11/1994 | Liebl et al. | |
| 5,450,999 A * | 9/1995 | Scholten et al. | ........... 236/49.3 |
| 5,634,590 A | 6/1997 | Gorski et al. | |
| 5,822,997 A | 10/1998 | Atterbury | |
| 5,950,662 A | 9/1999 | Scott | |
| 5,964,246 A * | 10/1999 | Meeker | ...................... 137/360 |
| 5,967,175 A | 10/1999 | Bouzaglou | |
| 6,032,616 A | 3/2000 | Jones | |
| 6,259,970 B1 * | 7/2001 | Brundisini | ................... 700/284 |
| 6,272,401 B1 * | 8/2001 | Boger et al. | ................ 700/282 |

(Continued)

*Primary Examiner*—Edward K. Look
*Assistant Examiner*—John K. Fristoe, Jr.
(74) *Attorney, Agent, or Firm*—Katten Muchin Rosenman LLP (57) ABSTRACT

A municipal water supply control system includes an underground water main, at least one water consumer station downstream from the water main, and an underground water delivery channel joining the water main to the water consumer. Underground valve means may be located either in the underground water main, the underground water delivery channel or in between the two for controlling the passage of water to each water consumer. Underground valve actuation means responsive to an activation signal activate the underground water valve means between a closed condition and an open condition. A data channel means establishes a wired or wireless data channel between a valve activation control means for issuing the activation signal and the underground valve actuation means.

29 Claims, 7 Drawing Sheets

U.S. PATENT DOCUMENTS

| | | |
|---|---|---|
| 6,293,471 B1 | 9/2001 | Stettin et al. |
| 6,336,593 B1 | 1/2002 | Bhatnagar |
| 6,337,635 B1 * | 1/2002 | Ericksen et al. ....... 340/825.69 |
| 6,491,062 B1 * | 12/2002 | Croft .................... 137/624.11 |
| 6,741,915 B1 | 5/2004 | Poth |
| 6,785,630 B1 | 8/2004 | Kolk et al. |

* cited by examiner

MUNICIPAL WATER DELIVERY CONTROL SYSTEMS

The entire subject matter of U.S. Provisional applications Ser. No. 60/492,211 filed Aug. 1, 2003 and 60/525,752 filed Nov. 28, 2003 and both entitled MUNICIPAL WATER DELIVERY CONTROL SYSTEMS are incorporated herein by reference. The applicant claims priority benefit under Title 35, United States Code, Section 119(e) of U.S. Provisional applications Ser. No. 60/492,211 filed Aug. 1, 2003 and 60/525,752 filed Nov. 28, 2003, and both entitled MUNICIPAL WATER DELIVERY CONTROL SYSTEMS.

BACKGROUND OF THE INVENTION

1. Field of the Invention

The present invention relates to the control of municipal water supplies, and more particularly to the control of the delivery of water to a municipal water consumer.

2. Description of the Related Art

When buildings, such as industrial and commercial structures (known to the trade as the ICI market), as well as residential structures such as homes, are built and water delivery and plumbing systems installed, a connection is made between the municipal water main and a water service pipe to the building. A shut-off valve (commonly referred to as a curb stop), is installed along the water service pipe at a position between the water main and the building. The curb stop typically has a valve body which is mounted on a concrete slab about eight feet below the ground surface. In order to actuate the curb stop, an extension service box must span the eight feet to the ground surface and provide a fitting which is manipulated by a wrench.

The curb stop and the extension service box must be installed early in the construction of the building. Typically, a pipe is placed over the service box. In a residential subdivision, for example, the pipe is then supported by one or more 2×4 stud driven into the ground, while in the industrial market, the pipe is usually freestanding. The heavy equipment used in new construction can often damage the service box, which remains fully exposed on the surface and prone to such damage until the construction area is complete.

Over time, the earth tends to settle which leads the service box to project above its preferred flush location at the ground surface. Frost also tends to cause the service box to shift or heave. This usually results in remedial work. Municipalities typically incur large costs to repair damaged service boxes and surrounding ground surface features as a result of settling and heaving. Municipalities also face potentially severe liabilities arising from personal injuries caused by damaged service boxes.

It is an object of the present invention to provide a novel municipal water delivery control system.

SUMMARY OF THE INVENTION

In one of its aspects, the present invention provides a municipal water supply control system, comprising an underground water main, at least one water consumer station downstream from the water main and an underground water delivery channel joining the water main to the water consumer, underground valve means located either in the underground water main, the underground water delivery channel or there between for controlling the passage of water to the water consumer, underground valve activation means, responsive to an activation signal for activating the underground water valve means between a closed condition and an open condition, valve activation control means for issuing the activation signal and data channel means for establishing a wired or wireless data channel between the valve activation control means and the underground valve actuation means to deliver the activation signal thereto.

In an embodiment, the underground valve activation means includes a solenoid actuator operably coupled with the underground valve means to displace the valve means between the open and closed positions. In one example, the open position is a fully open position and the closed position is a fully closed position.

In an embodiment, the underground valve activation means includes indication means for conveying a signal indicative of an open or closed position of the underground valve means. In this case, the indication means may include a limit switch or other switching arrangements.

In an embodiment, the activation control means includes an above-ground control cabinet, wherein the water consumer includes a building having an exterior wall. In this case, the above-ground control cabinet is mountable on the exterior wall. However, the cabinet may be provided in some other form, such as a protected weather tight chamber located at or near the ground surface. In one example, a lock means is provided for controlling access to the above-ground cabinet.

In an embodiment, the valve activation control means includes a first communications portion and the underground valve activation means includes a second communications portion and the first and second communications portions are operable to establish a data link there between. For example, the first and second communications portions may be operable under an RS485 signal transmission protocol, though other protocols may also be used.

In an embodiment, the valve activation control means includes a portable housing with the one or more batteries contained in the housing, for powering the valve activation control means.

In an embodiment, the underground valve means includes a drive motor and a valve housing, the valve housing having a first inlet and a first outlet and a channel there between, the valve housing containing a valve element movable between an open position and a closed position, respectively to open or close the channel.

In an embodiment, the motor has a drive axle which is powered unidirectionally and the valve element is movable between the closed and open positions under the action of the motor travelling at least a portion of one rotation.

In one example, the valve element is movable:

from a closed position to an open position when the motor axle travels from a first position to a second position; and from the open condition and the closed position when the motor axle travels from the second position to a third position, or the first position.

In another example, the valve element is movable:

from a closed position to an open position when the motor axle travels from the third position to a fourth position; and from the open condition and the closed position when the motor axle travels from the fourth position to a fifth position or the first position In still another example, the valve element is movable:

from a closed position to an open position when the motor axle travels from a North position to a West position;

from the open condition and the closed position when the motor axle travels from the West position to a South position;

from the closed position to the open position when the motor axle travels from the South position to an East position; and from the open position to the closed position when the motor axle travels from the East position to the North position.

In an embodiment, the activation signal includes a data component representative of a target position for the valve element. The system further includes detection means for detecting the position of the motor axle in order to determine the current position of the valve element, and comparison means for comparing the target position with the current position. In this case, the detection means includes a limit switch to detect the transition of the valve through at least two of the first, second, third, fourth or fifth (or more if need be) positions, or at least two of the North, West, South and East positions. The limit switch moves from a low condition to a high condition when the valve moves from a closed position to an open position, and from a high condition to a low condition when the valve moves from the open position to the closed position. The detection means is operable, when responding to an activation signal to open the valve, to detect a transition of the limit switch from a low condition to a high condition. The detection means is also operable, when responding to an actuation signal to close the valve, to detect a transition of the limit switch from a high condition to a low condition. The detection means may involve other detection devices beyond limit switches, such as a sevro motor which is capable of providing precise rotational adjustments of the valve element.

In an embodiment, the system has memory means for storing limit switch transition data representative of a last known state of the limit switch. In this case, the detection means is operable to access the transition data from the memory means.

In another of its aspects, the present invention provides a method of controlling a municipal water supply, of the type having an underground water main, comprising the steps of providing at least one water consumer station downstream from the water main, providing an underground water delivery channel joining the water main to the water consumer, locating an underground valve either in the underground water main, the underground water delivery channel or there between for controlling the passage of water to the water consumer, providing an underground valve activation unit, which is responsive to an activation signal, for activating the underground water valve means between a closed condition and an open condition, and providing a valve activation control unit for conveying the activation signal to the underground water valve unit.

In still another of its aspects, the present invention provides a method of controlling a municipal water supply, of the type having an underground water main, at least one water consumer station downstream from the water main, an underground water delivery channel joining the water main to the water consumer and an underground valve for controlling the passage of water to the water consumer, comprising the steps of providing an underground valve activator which is responsive to an activation signal for activating the underground water valve between a closed condition and an open condition, providing a valve activation controller for issuing the activation signal; and providing a data channel between the valve activation controller and the valve activator to deliver the activation signal thereto to the underground water valve means.

In one embodiment, the step of providing a data channel includes the step of providing the valve activation controller with a first communications portion and the underground valve activator with a second communications portion, the first and second communications portions operable to establish a data link, for example under an RS485 signal transmission protocol, between the first and second communications portions.

In one embodiment, the step of providing an underground valve activator includes the steps of providing a unidirectional drive motor and a valve housing with a first inlet and a first outlet and a channel there between, locating a valve element in the housing which is movable between an open position and a closed position, respectively to open or close the channel, and powering the drive motor unidirectionally so that the valve element is movable between the closed and open positions under the action of the motor travelling at least a portion of one rotation. Alternatively, other actuators or motors may be used, such as servo motors and/or other reversing or non reversing motors.

In one embodiment, the step of providing an underground valve activator includes the steps of arranging the valve element to be movable:

from a closed position to an open position when the motor axle travels from a first position to a second position; and from the open condition and the closed position when the motor axle travels from the second position to a third position.

In one embodiment, the step of providing an underground valve activator includes the steps of arranging the valve element to be movable:

from a closed position to an open position when the motor axle travels from the third position to a fourth position; and from the open condition and the closed position when the motor axle travels from the fourth position to a fifth position.

In one embodiment, the step of providing an underground valve activator includes the steps of arranging the valve element to be movable:

from a closed position to an open position when the motor axle travels from a North position to a West position;

from the open condition and the closed position when the motor axle travels from the West position to a South position;

from the closed position to the open position when the motor axle travels from the South position to an East position; and from the open position to the closed position when the motor axle travels from the East position to the North position.

In one embodiment, the method further comprises the step of configuring the activation signal to include a data component representative of a target position for the valve element.

In one embodiment, the method further comprises the step of providing a detector unit for detecting the position of the motor axle in order to determine the current position of the valve element.

In one embodiment, the method further comprises the step of providing a comparator unit for comparing the target position with the current position.

In one embodiment, the step of providing a comparator unit includes providing a limit switch to detect the transition of the valve through at least two of the first, second, third, fourth or fifth positions, or at least two of the North, West, South and East positions.

In one embodiment, the step of providing a limit switch includes the step of configuring the limit switch to move from a low condition to a high condition when the valve moves from a closed position to an open position, and from a high condition to a low condition when the valve moves from the open position to the closed position.

In still another of its aspects, there is provided a kit for controlling a municipal water supply of the type having an underground water main, at least one water consumer station downstream from the water main and an underground water delivery channel joining the water main to the water consumer, the kit comprising valve means configured to be positioned underground either in the underground water main, the underground water delivery channel or there between for controlling the passage of water to the water consumer, valve activation means configured to be located underground and to be responsive to an activation signal, for activating the underground water valve means between a closed condition and an open condition, and valve activation control means configured to be positioned above ground for conveying the activation signal to the underground water valve means.

In still another of its aspects, the present invention provides a kit for controlling a municipal water supply of the type having an underground water main, at least one water consumer station downstream from the water main and an underground water delivery channel joining the water main to the water consumer, the kit comprising a valve unit configured to be positioned underground either in the underground water main, the underground water delivery channel or there between for controlling the passage of water to the water consumer, a valve activator unit configured to be located underground and to be responsive to an activation signal for activating the valve unit between a closed condition and an open condition, a valve activation controller configured to be positioned above ground for issuing the activation signal to the underground water valve means and a pair of data channel transceivers for establishing a wired or wireless data channel between the valve activator and the underground means to deliver the activation signal thereto.

In yet another of its aspects, the present invention provides a kit for use with a municipal water supply for enabling remote control thereof, the water supply being of the type having an underground water main, at least one water consumer station downstream from the water main and an underground water delivery channel joining the water main to the water consumer and a valve unit configured to be positioned underground either in the underground water main, the underground water delivery channel or there between for controlling the passage of water to the water consumer, the kit comprising a valve activator unit configured to be located underground and to be responsive to an activation signal for activating the valve unit between a closed condition and an open condition, a valve activation controller for issuing the activation signal to the underground water valve means and data path means for establishing a data path to deliver the activation signal thereto.

In yet another of its aspects, the present invention provides a method of improving the operation of a municipal water supply of the type having an underground water main, at least one water consumer station downstream from the water main and an underground water delivery channel joining the water main to the water consumer and a valve unit configured to be positioned underground either in the underground water main, the underground water delivery channel or there between for controlling the passage of water to the water consumer, the kit comprising a remote activated valve actuation means for rendering the valve unit responsive to an activation signal for activating the valve unit between a closed condition and an open condition, a valve activation controller for issuing the activation signal to the underground water valve means and data path means for establishing a data path to deliver the activation signal thereto.

In yet another of its aspects, the present invention provides a method of controlling a municipal water supply of the type having an underground water main, at least one water consumer station downstream from the water main and an underground water delivery channel joining the water main to the water consumer; and an underground valve for controlling the passage of water to the water consumer, comprising:

a step for providing an underground valve activator which is responsive to an activation signal for activating the underground water valve between a closed condition and an open condition, and a step for providing a valve activation controller for issuing the activation signal; and providing a data channel between the valve activation controller and the valve activator to deliver the activation signal thereto to the underground water valve means.

In yet another of its aspects, the present invention provides a method of improving the control of a municipal water supply, of the type having an underground water main, at least one water consumer station downstream from the water main, an underground water delivery channel joining the water main to the water consumer and an underground valve for controlling the passage of water to the water consumer, comprising the steps of retrofitting the underground to be responsive to an activation signal for activating the underground valve between a closed condition and an open condition, providing a valve activation controller for issuing the activation signal; and providing a data channel between the valve activation controller and the valve activator to deliver the activation signal thereto to the underground water valve means.

In yet another of its aspects, the present invention provides a remote controlled municipal water supply control system, comprising an underground water main, at least one water consumer station downstream from the water main and an underground water delivery channel joining the water main to the water consumer, underground valve means located either in the underground water main, the underground water delivery channel or there between for controlling the passage of water to the water consumer, underground valve activation means, responsive to an activation signal for activating the underground water valve means between a closed condition and an open condition, remote valve activation control means for issuing the activation signal and data channel means for establishing a wired or wireless data channel between the valve activation control means and the underground valve actuation means to deliver the activation signal thereto.

In one embodiment, the remote valve activation control means includes a control pod located at, near or above the ground surface or at a location remote therefrom.

In one embodiment, the valve activation control means includes a programmed logic controller, or is embodied in a software program configured to run on a general purpose computer including a desktop or notebook personal computer, a cellular telephone, a personal digital assistant, or a computer mainframe which is operable to work within a network.

In one embodiment, the network includes one or more general purpose computers joined in a local area network or via internet.

In a further aspect, the present invention provides a computer program product encoded in a computer readable fixed or temporary medium or signal including a plurality of computer executable steps for a computer to control an underground valve in a municipal water supply of the type having an underground water main, at least one water consumer station downstream from the water main and an underground water delivery channel joining the water main to the water consumer, wherein the underground valve is responsive to an underground valve actuator to control the passage of water to the water consumer, comprising the computer executable steps:

establishing a communication link with the underground valve actuator;

storing data representative of at least operative position of the underground valve; and issuing an instruction signal to the underground valve actuator to change the operative position of the underground valve.

The readable fixed or temporary medium or signal includes such things as ROM and RAM memory both internal and external to a computer, compact discs other portable media of that sort, as well as signals conveyed to or between computers in internal or external networks and the like.

In an embodiment, the computer program product further comprises the computer executable step of querying the underground valve activator for a current operative position.

In an embodiment, the computer program product further comprises the computer executable step of receiving data from the underground valve actuator representative of the current operative position.

In another further aspect, the present invention provides a computer program product encoded in a computer readable fixed or transient medium or signal including a plurality of computer executable steps for a computer to control an underground valve in a municipal water supply of the type having an underground water main, at least one water consumer station downstream from the water main and an underground water delivery channel joining the water main to the water consumer, wherein the underground valve is responsive to an underground valve actuator to control the passage of water to the water consumer, comprising:

executing a step to establish a communication link with the underground valve actuator;

executing a step to store data representative of at least operative position of the underground valve; and executing a step to issue an instruction signal to the underground valve actuator to change the operative position of the underground valve.

In another further aspect, the present invention provides a computer-readable data structure useful to control an underground valve in a municipal water supply of the type having an underground water main, at least one water consumer station downstream from the water main and an underground water delivery channel joining the water main to the water consumer, wherein the underground valve is responsive to an underground valve actuator to control the passage of water to the water consumer, comprising data representative of an operative current position of the underground valve.

In another further aspect, the present invention provides a signal propagated on a carrier medium, the signal including data encoding a current operative position of an underground valve in a municipal water supply.

In another further aspect, the present invention provides a signal propagated on a carrier medium, the signal including data encoding an instruction to an underground valve actuator to change an operative position of an underground valve in a municipal water supply.

Thus, the present invention contemplates, among others, full installations of water supply control systems, such as those in municipal applications, as well as the partial or full retrofitting of an existing water supply control system, where the retrofit task may involve the replacement of a valve, or the reconfiguring of a valve, in both cases to be responsive to an external activation signal, as well computer implemented processes to control them.

BRIEF DESCRIPTION OF THE DRAWINGS

Several preferred embodiments of the present invention will now be described, by way of example only, with reference to the appended drawings in which.

DESCRIPTION OF THE PREFERRED EMBODIMENTS

Figure 1:
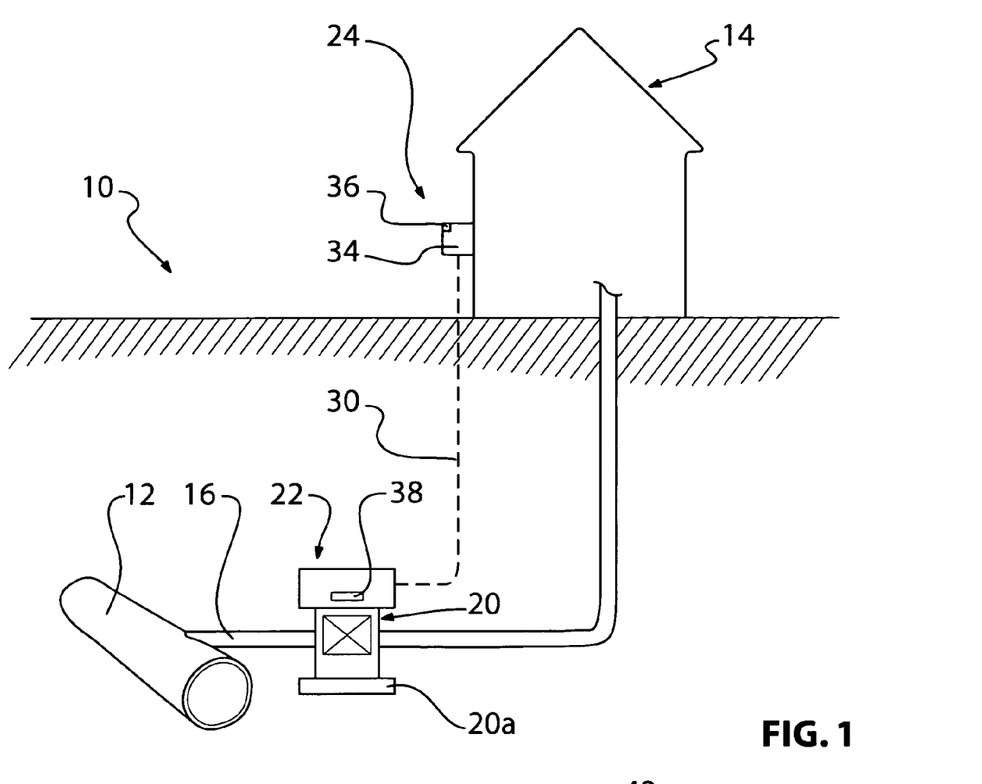
FIG. 1 is a schematic view of a municipal water delivery control system.
Figure 2:
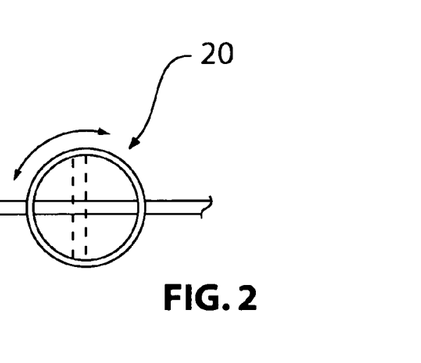
FIGS. 2, 3 and 4 are schematic views of different portions of the control system of FIG. 1.

FIG. 1 illustrates a municipal water supply control system 10, comprising an underground water main 12, at least one water consumer station 14, in the form of a building, downstream from the water main and an underground water delivery channel 16 joining the water main to the water consumer. An underground valve 20 is located in the underground water delivery channel 16 for controlling the passage of water to the water consumer and is actuated by an underground valve activator 22. Located above ground, preferably on an exterior or interior side wall of building 14 is a valve activation controller 24 for conveying the activation signal to the underground water valve along conductive path 30.

The valve activation controller 24 is preferably located in an above ground control cabinet 34 mountable on the wall of the building 14. The control cabinet may be provided with a lock 36 for controlling access thereto, for example only to those municipal officials entitled to access. The lock 36 may be of the key or keyless variety, in the latter case by providing access after receiving a verification code, such as a pass code entered in a key pad, integrally formed with the lock or separate therefrom, as shown at 36a, in FIG. 4, or by way of biometric data, retinal scans or the like.

The conductive path 30 may be a dedicated low voltage wire, or may be in another form. For example, the activation signal may be transmitted, if desired, through the building's wiring or plumbing in manner to deliver the activation signal to the valve along high voltage power delivery line to the valve.

The activation signal may be transmitted over an optical carrier wave transmitted on a fibre network, an RF carrier signal transmitted over an RF network or in other forms. The controller may be a hand held unit which is capable of transmitting a wireless signal to the valve or to an antenna station in communication with the valve. For example, the hand held controller may be provided with an RFID chip which may be powered internally or externally by such power sources as battery or an internal power generating module such as solar power generator operating in the presence of solar radiation, or an inductive power generator operating in the presence of microwave or RF radiation. The power supply portion may include a conductive path to an external power source.

Thus, the activation signal may be delivered by a carrier wave, which may include radio frequency waves, microwaves or waves or signals of other frequencies or frequency ranges, and encoded on the wave by frequency modulation, amplitude modulation, wave superposition or a combination thereof.

The valve activation controller 24 may include a programmed logic controller or some other form of controller. It may be included in a software program configured to run on a general purpose computer, such as personal computer, or on a more substantial computer mainframe, which is operable to work within a network. The network may thus involve several general purpose computers, for example those sold under the trade names APPLE™ or IBM™, or clones thereof, which are programmed with operating systems known by the trade names WINDOWS™, LINUX or other well known or lesser known equivalents of these. The system may involve pre-programmed software using a number of possible languages or a custom designed version of a programming software sold under the trade name ACCESS™ or similar programming software. The computer network may be a wired local area network, or a wide area network such as the Internet, or a combination of the two, with or without added security, authentication protocols, or under "peer-to-peer" or "client-server" or other networking architectures. The network may also be a wireless network or a combination of wired and wireless networks. The wireless network may operate under frequencies such as those dubbed 'radio frequency' or "RF" using protocols such as the 802.11, TCP/IP, BLUE TOOTH and the like, or other well known Internet, wireless, satellite or cell packet protocols. The control function of the valve activation controller 24 may, alternatively, be executed on a single custom built computer which is dedicated to the function of the system alone.

Thus, while the preferred embodiment employs a controller mounted on the side of the building 14, it may be employed in a range of other forms. The controller may be resident in a computer implemented system which is either local to the building 14 or remote therefrom and accessible to the valve via a direct internet connection, that is if the valve has its own IP address or indirectly accessible through a building IP address.

The valve activator 22 includes a solenoid actuator, shown schematically at 38 operably coupled with the valve wherein actuation of the solenoid displaces the valve means between the open and closed positions. In one case, the open position is a fully open position and the closed position is a fully closed position. A suitable valve and valve activator is available under the trade name WORCESTER CONTROLS (FLOWSERVE). at www.worcestercc.com, under model number SERIES 36 ELECTRIC ACTUATOR.

Figure 3:
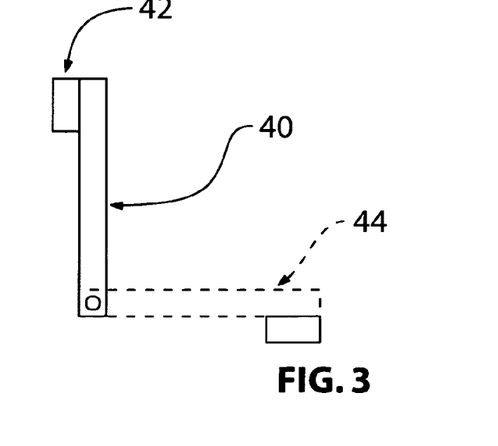
Figure 4:
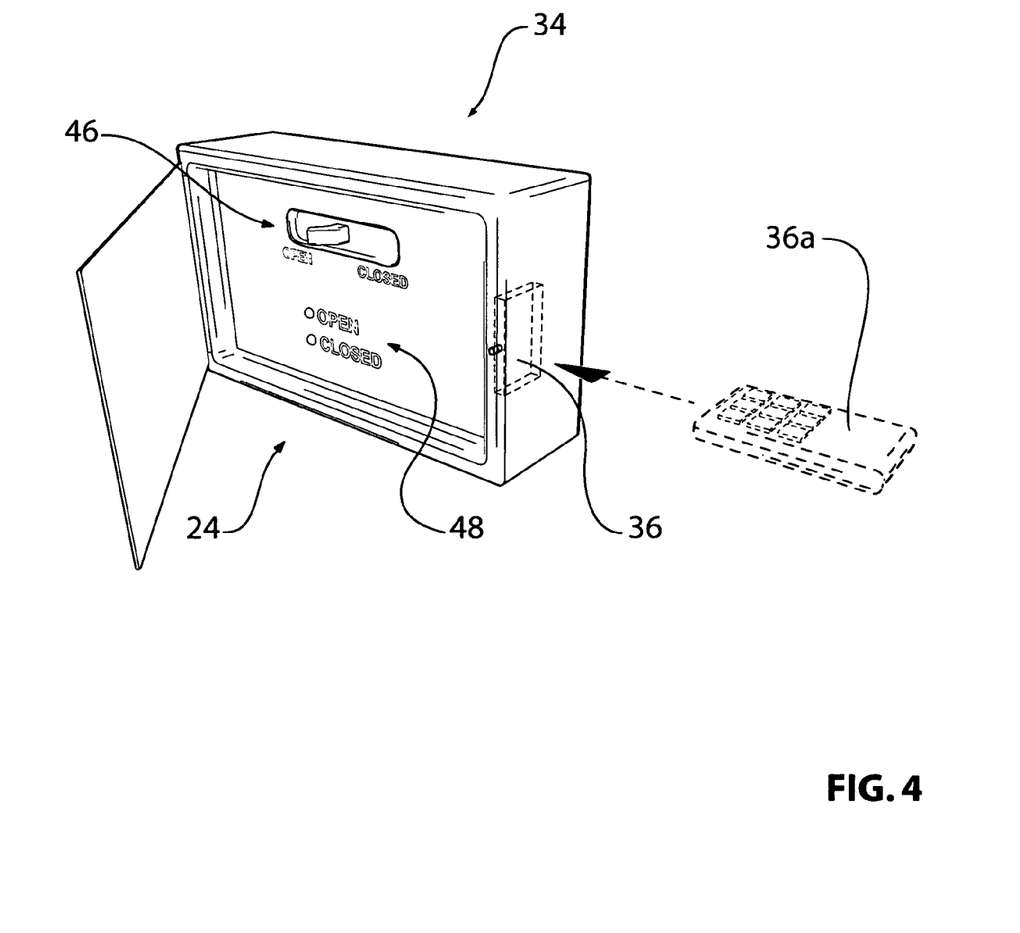

The valve activator has a limit switch shown schematically at 40 in FIG. 3, which emits a status signal indicative of the condition of the valve. For example, the limit switch may indicate two conditions, the "fully open" position 42 and "fully closed" position 44. Referring to FIG. 4, the valve activation controller 24 is provided with a signal switch 46 movable between open and closed positions and has a status indicator 48 which is responsive to the status signal from the limit switch 40 to display the condition of the valve. The status indicator is provided, in this case, by a pair of light emitting diodes, but may also be provided by other indicators such as digital and analog displays and the like. In addition, the status indicator may be a signal receiving or displaying device remote from the valve actuator itself which displays a status, such as for instance, a tone or audio message, or a graphic, either on a remote telephone, a remote computer, a remote personal digital assistant or other remote communications device.

The system 10 is used as follows. First, the underground water main 12, water consumer station 14 downstream from the water main 12 and underground water delivery channel 16 are located and the valve 20 and valve activator 22 are installed according to the appropriate governing building codes, including the mounting of the valve 20 on a cement pad, as shown at 20a. Alternatively, the underground water main 12, water consumer station 14 downstream from the water main 12, underground water delivery channel 16 and the valve 20 may be located and the valve 20 may be retrofitted with the valve actuator 22. The control cabinet 34 and the valve activation controller 24 are installed at their designated location on the building and a data link is established between the valve activation controller 24 and the valve actuator along conductive path 30.

The municipal worker may then gain access to the control cabinet and initiate a valve activation sequence, first by viewing the status of the valve and then by activating the valve as desired, via switch 46.

In so doing, the municipal worker need not access a manual service box at the ground surface, nor does the municipality need to undertake the otherwise expensive remedial work necessary to repair damage due to frost heaving, ground settling, tampering or misuse, and the like. That being said, the control cabinet 34 may be located at, below, above, adjacent or near the ground surface in other arrangements as may be needed or desired in some installations.

Figure 5:
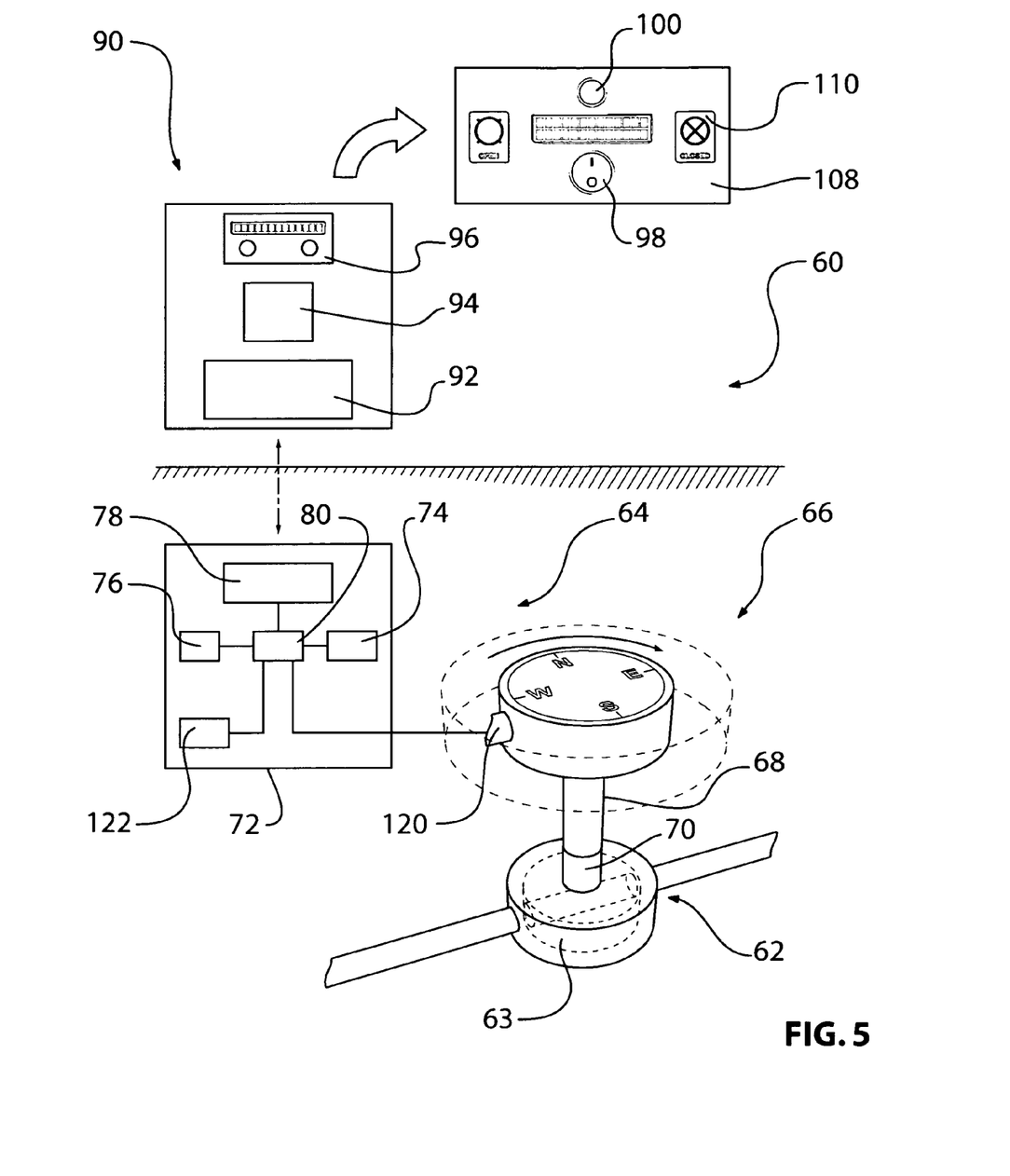
FIG. 5 is a schematic view of a portion of an alternative municipal water delivery control system.

Another municipal water supply control system is shown at 60 in FIG. 5 having an underground valve 62 which is activated by an underground valve activator station 64. The underground valve activator station 64 has a motor 66 whose motor axle 68 is attached to a central shaft 70 on the valve 62 to move a valve element, shown schematically at 63, between a closed position and an open position, as will be described. The underground valve activator station 64 also includes a motor controller 72 which includes a motor driver 74, a serial number generator 76 and a data transceiver 78, all of which are controlled by a micro controller 80.

The control system 60 has a valve activation controller 90 with a data transceiver 92 for exchanging data with the data transceiver 78, under an RS485 signal transmission protocol, which is more fully described herein below under the heading SERIAL COMMUNICATION PARAMETERS. The data transceiver 92 is responsive to a micro controller 94 which governs the control sequences of the system and displays the status thereof through a digital display 96. In addition, valve activation controller 96 includes a number of user-adjustable buttons 98, 100 for a user to initiate a valve control sequence, again as will be described.

Figure 6:
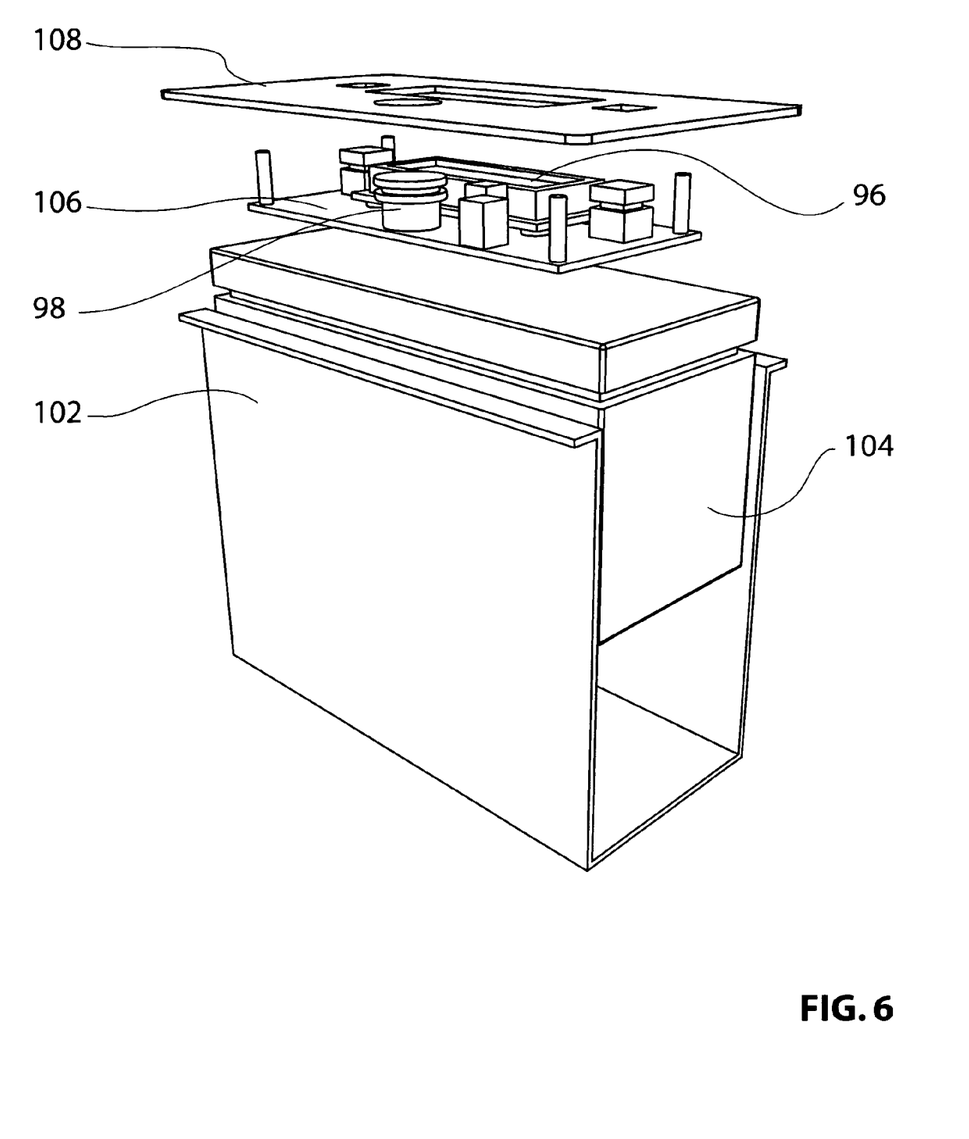
FIG. 6 is an exploded assembly view of a portion of the system of FIG. 5.

Referring to FIG. 6, the valve activation controller includes a portable housing 102 and includes one or more batteries 104 contained therein, along with a circuit board 106 on which the digital display 96 is integrally formed, and a cover layer 108, the latter of which containing the appropriate identifying indicia to allow the user to identify the display, the status indicators and the buttons available thereon. The display has a number of flexible regions, as shown in the dashed lines at 110 in FIG. 5, permitting buttons there beneath to be actuated by pressing against the cover layer 108.

Referring to FIG. 5, the motor axle 68 is powered unidirectionallly and the valve element 63 is movable between the closed and open positions under the action of the motor travelling at least a portion of one rotation. The valve element 63 is movable:

from a closed position to an open position when the motor axle travels from a North position to a West position;

from the open condition and the closed position when the motor axle travels from the West position to a South position;

from the closed position to the open position when the motor axle travels from the South position to an East position; and from the open position to the closed position when the motor axle travels from the East position to the North position.

The control system 60 is provided with a detection means for detecting the position of the motor axle 68 in order to determine the current position of the valve unit 63. In this case, the activation signal from the valve activation controller 90 includes a data component representative of a target position for the valve (either "open" or "closed") and a comparison means is provided for comparing the "target" position with the "current" position.

The detection means includes a limit switch, shown schematically at 120, to detect the transition of the valve through at least two of the North, West, South and East positions. The limit switch functions as a cam element on a portion of the motor axle 68 and moves from a low condition to a high condition when the valve moves from a closed position to an open position, and from a high condition to a low condition when the valve moves from the open position to the closed position. In this case, the limit switch 120 will move from the open to the closed position twice through a full rotation of the motor axle 68.

The detection function is also provided by the micro controller 80 which is in communication with the limit switch to detect a transition of the limit switch 120 from a low condition to a high condition, in response to an activation signal to open the valve. In this case, the detection means may be operable to detect a transition of the limit switch 120 from high to low, in response to an activation signal to close the valve.

The underground activation station 64 also includes a memory means in the form of a memory module that 122 is provided for storing limit switch transition data representative of a last known state of the limit switch. In this case, the detection means accesses the transition data from the memory module 122.

Figure 7:
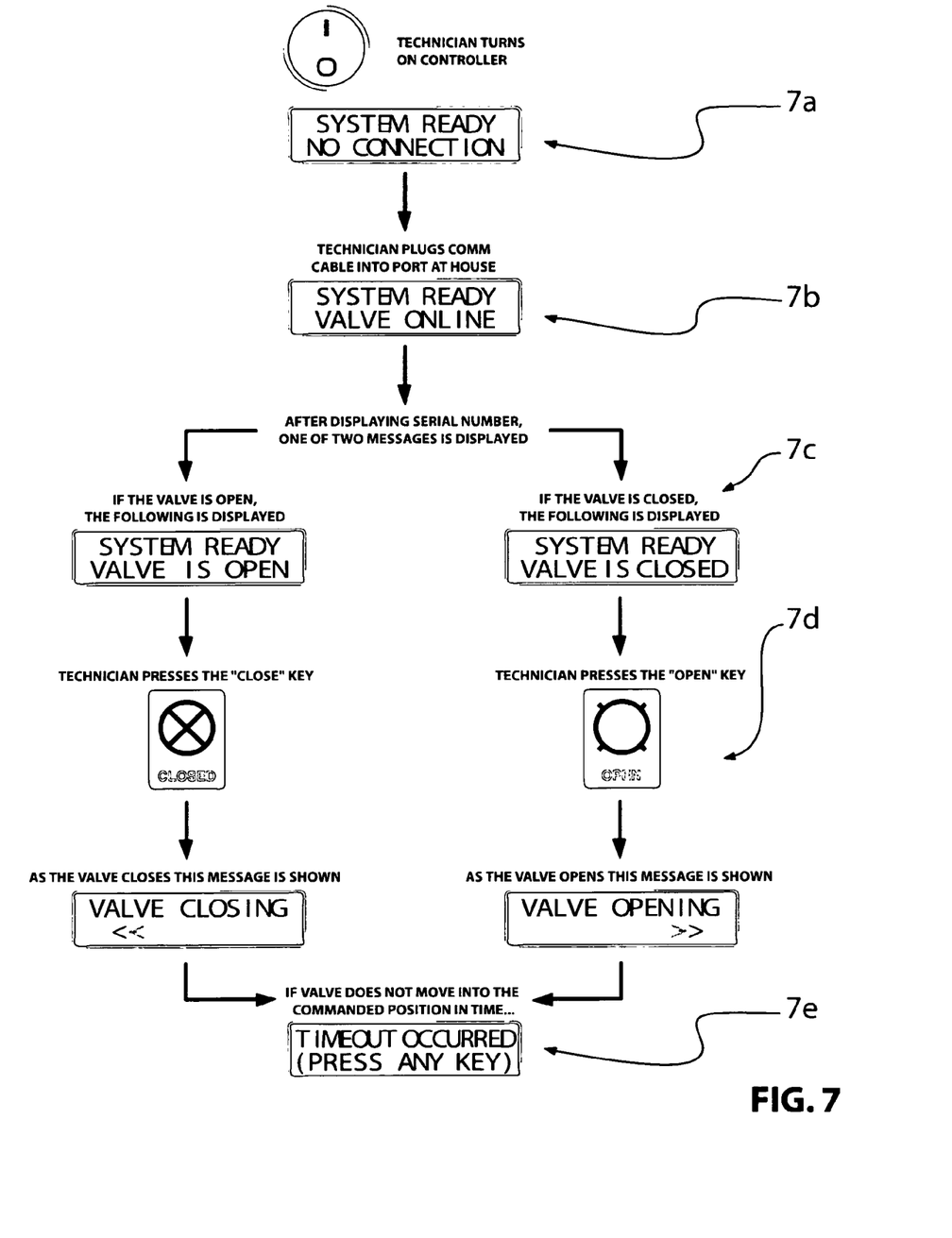
FIG. 7 is an operational flow chart of the system of FIG. 5.
Figure 8:
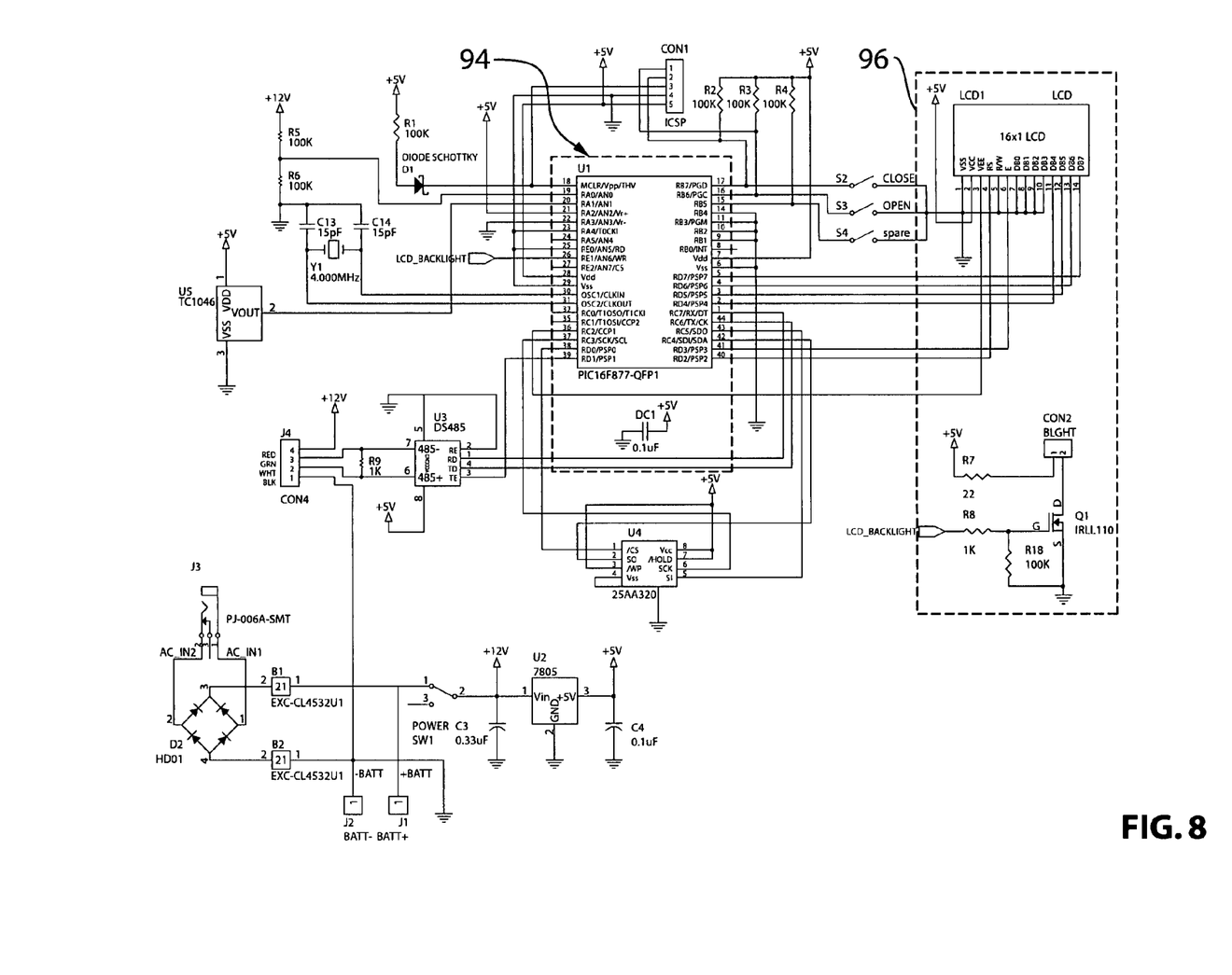
FIGS. 8 and 9 are schematic views of portions of the system of FIG. 5.
Figure 9:
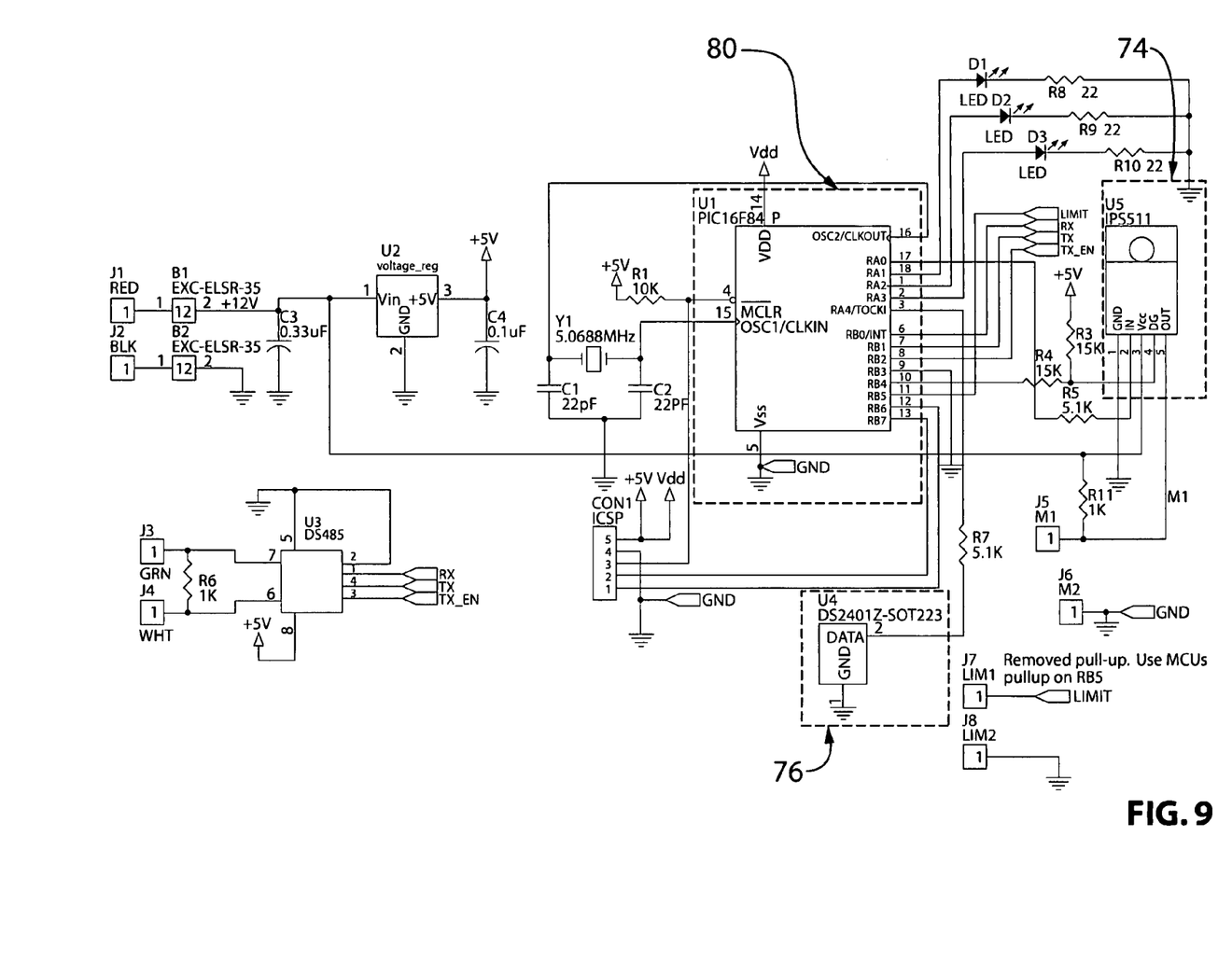

Referring to FIG. 7, the control system 60 is used as follows. The valve 62 and the valve activator station 64 are installed (or alternatively, the valve 62 is retrofitted with the valve activator station 64 as the case may be in some applications) and the valve activation controller 90 is configured for data exchange with the valve activator station, following the RS485 protocol as described below, which will include establishing a data link, along the conductive path 30, such as by coupling one end of a serial cable to the appropriate port on the valve activation controller 90, (where the other end of the cable is already coupled to the corresponding port on the valve activator station 64) and placed at an appropriate location at the ground surface or above the ground surface. For example, the serial cable may be located in a ground level access weather protected chamber or on a wall mounted cabinet (as in the case of the system 10 above).

Until such time as the cable is properly attached, the digital readout indicates a "no connection" condition as shown at step 7*a*. The user then will see a change in the status after the cable has been installed as shown at step 7*b*. Next, the activation controller 90 determines the current status of the valve by conveying a query signal to the valve activator station 64. Consequently, the micro controller 80 accesses the memory model 122 for the last known state of the limit switch 120. The valve activator station 64 then transmits a signal to the valve activation controller 90, to be received by the micro controller 94 and which conveys a status signal to the display 96, either indicating that the valve is open or that the valve is closed, as shown by the alternative conditions at step 7*c*.

If the valve is OPEN, the user may then press the CLOSE key and, similarly, if the valve is CLOSED, the user may then press the OPEN key, as shown by the alternative conditions of step 7*d*.

Finally, if the valve does not move into the commanded position in time (that is over a preset time out period of, say, about 1 second to about 5 seconds, more preferably about 3 seconds, as shown by step 7*e*.

Serial Communication Parameters

The data transceivers 78 and 92 communicate with one another through an RS485 point to point connection. The RS485 standard provides for transmission lengths of up to 4000 feet at slow data rates. Serial communication between the valve activation controller and the valve circuit uses the following parameters:

| Protocol | # Data Bits | # Stop Bits | Parity | Data Rate |
|---|---|---|---|---|
| RS485 Half Duplex | 8 | 1 | None | 9600 bps |

Physical and Electrical Connection

The valve activator station 64 and valve activation controller 90 connect to one another using the RS485 data transceivers 78 and 92 and associated connector hardware at each end point. The RS485 transceivers 78 and 92 use a differential asynchronous signal to transmit data. While RS485 allows for multidrop networking, this hardware is used in this case as a point-to-point connection.

The TE or "transmit enable" line is toggled by the module hardware. It is an active high signal, so normally it is set low to allow the module to continuously receive data. When the module needs to send data back, it sets the TE line high. The RE line is an active low "read enable", so the two lines can be connected together. TD is the "transmit data" line, and RD is the "receive data" line. Both transceivers are set to continuously allow reception of data, but only transmit when the TE line is pulled high.

Packet Error Detection

Errors in packet data are detected by use of a cyclical redundancy check (CRC) on each data packet. The CRC is a two-byte number that is a function of the bytes in the data packet that precede it. It is similar to a "signature" for the data packet, that can be considered unique for every distinct data packet. The sender calculates the CRC for the data packet being transmitted, and then transmits those two bytes at the end of the data packet. The receiver will calculate its own CRC of the data it receives, and compare it to the CRC included in the data packet. If the two numbers match, it is considered a good CRC. If the CRCs do not match, the data packet is considered corrupted and is ignored. No error correction will take place, it simply waits for the next data packet to be sent.

Collision Avoidance

Data bus contention or "collisions" will occur if more than one device attempts to transmit data at the same time. For example, if the valve activation controller 90 were to transmit a command packet at the same time that the valve transmits a status packet, the two packets would corrupt each other and the data would be indecipherable. To prevent this situation, a time-division protocol has been implemented. The valve activation controller 64 does not attempt to transmit any packet data until it has received a valid (i.e. packet data with a correctly matched CRC) status packet from the valve activator station 64. It then waits approximately 10 milliseconds, and transmits a response packet. The valve in turn will wait approximately 100 milliseconds before transmitting its next packet. Since the 11-byte packets only take a short period of time to transmit, this protocol ensures that two packets are never sent at the same time.

Valve Packet Data Description

| The valve will continuously transmit the following 11-byte packet on a 100 ms interval any time it has power. VALVE TRANSMITTED PACKET (OCCURS EVERY 100 ms) | | | | | | | | | | |
|---|---|---|---|---|---|---|---|---|---|---|
| BYTE | 0 | 1 | 2 | 3 | 4 | 5 | 6 | 7 | 8 | 9 10 |
| DESC | SYNCH | | STATUS | 6-byte unique ID | | | | | | 2-byte CRC |

SYNCH—(Bytes 0 and 1)

The two bytes 0x01 and 0x7F. (Binary 0000 0001 0111 1111)

STATUS—(Byte 2)

The status byte contains information on the inner operation of the valve circuit and the state the motor is in. This byte contains the most useful information. A bit by bit description of the data contained in the STATUS byte is shown below.

| BIT | 7 | 6 | 5 | 4 | 3 | 2 | 1 | 0 |
|---|---|---|---|---|---|---|---|---|
| NAME | GLOBAL FAULT | OVER TEMP | OVER CURRENT | Not used | Not used | Not used | LIMIT SWITCH | MOTOR ON |
| DESC | 0 = OK 1 = FAULT | 0 = OK 1 = FAULT | 0 = OK 1 = FAULT | X | X | X | 1 = open 0 = closed | 1 = ON 0 = OFF |

BIT7—If any fault occurs, BIT7=1. If the circuit does not detect anything wrong, BIT7=0.

BIT6—If the onboard motor driver is in an over temperature condition, it will shut itself down and BIT6=1. Otherwise, BIT6=0.

BIT5—If the onboard motor driver is using more current than it should (i.e. in a stall or a short-circuit situation), it will shut down and BIT5=1. Otherwise, BIT5=0.

BIT4–BIT2—Not currently used.

BIT1—If the cam switch is closed (indicating the valve is open), BIT1=1. If the cam switch is open (indicating the valve is closed), BIT1=0.

BIT0—If the motor is turning, BIT0=1. If the motor is shut off, BIT0=0.

UNIQUE ID—(Bytes 3 to 8)

A 48-bit unique serial number as generated by serial number generator 76, for example in the form of a DS2401Z device, provided by Dallas Semiconductor. 48 bits allows for a total number of 281,474,976,710,656 different serial numbers.

CRC—(Bytes 9 and 10)

A cyclical redundancy check based on a function of bytes 2–8. Upon receiving the packet, the receiver should generate its own CRC. If the calculated CRC does not match the transmitted CRC, the entire packet is ignored.

Controller Packet Data Description

Approximately 10 milliseconds after the valve activation controller receives a valid (i.e. CRC passed) packet from the valve, it transmits an 11-byte response packet back to the valve. This packet controls the operation of the valve activation controller 90 circuitry within the valve activator station 64.

| CONTROLLER TRANSMITTED PACKET (must follow valve packet by at least 10 ms) | | | | | | | | | | |
|---|---|---|---|---|---|---|---|---|---|---|
| BYTE | 0 | 1 | 2 | 3 | 4 | 5 | 6 | 7 | 8 | 9 10 |
| DESC | SYNCH | | DATA | 6-byte unique ID | | | | | | 2-byte CRC |

SYNCH—(Bytes 0 and 1)

The two bytes 0x01 and 0x7F. (Binary 0000 0001 0111 1111)

DATA—(Byte 2)

The DATA byte contains commands to open or close the valve, or shut off power to the motor. A bit by bit description of the data contained in the STATUS byte is shown below.

| BIT | 7 | 6 | 5 | 4 | 3 | 2 | 1 | 0 |
|---|---|---|---|---|---|---|---|---|
| NAME | Not used | Not used | Not used | Not used | Not used | Not used | On/ Off | Open/ Close |
| DESC | X | X | X | X | X | X | 1 = ON 0 = OFF | 1 = Open 0 = Close |

BIT7–BIT2—Not currently used.

BIT1—To request that either the valve is opened or closed, BIT1=1. Otherwise, BIT1=0. This allows you to send packets without actually causing the valve to move.

BIT0—To command the valve to open, BIT0=1. To command the valve to close, BIT0=0.

UNIQUE ID—(Bytes 3 to 8)

The valve activation controller 90 retransmits the serial number it receives from the valve actuator station 64. The latter will ignore any serial packets that do not contain the same unique serial number it transmits in its own packets.

CRC—(Bytes 9 and 10)

A cyclical redundancy check based on a function of bytes 2–8. Upon receiving the packet, the receiver should generate its own CRC. If the calculated CRC does not match the transmitted CRC, the entire packet is ignored. This is an error-checking technique.

While the present invention has been described for what are presently considered the preferred embodiments, the invention is not so limited. To the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. A municipal water supply control system, comprising an underground water main, at least one water consumer station downstream from the water main and an underground water delivery channel joining the water main to the water consumer, underground valve means located either in the underground water main, the underground water delivery channel or there between for controlling the passage of water to the water consumer, underground valve activation means, responsive to an activation signal for activating the underground water valve means between a closed condition and an open condition, valve activation control means for issuing the activation signal and data channel means for establishing a wired or wireless data channel between the valve activation control means and the underground valve actuation means to deliver the activation signal thereto, the underground valve means including a drive motor and a valve housing, the valve housing having a first inlet and a first outlet and a channel there between, the valve housing containing a valve element movable between an open position and a closed position, respectively to open or close the channel, the activation signal includes a data conponent representative of a target position for the valve element, detection means for detecting the position of the motor axle in order to determine the current position of the valve element, and comparison means for comparing the target position with the current position.

2. A system as defined in claim 1, wherein the underground valve activation means includes a solenoid actuator operably coupled with the underground valve means to displace the valve means between the open and closed positions.

3. A system as defined in claim 2 wherein the open position is a fully open position and the closed position is a fully closed position.

4. A system as defined in claim 1, wherein the underground valve activation moans includes indication means for conveying a signal indicative of an open or closed position of the underground valve means.

5. A system as defined in claim 4, wherein the indication means includes a limit switch.

6. A system as defined in claim 1, wherein the activation control means includes an above-ground control cabinet.

7. A system as defined in claim 6, wherein the water consumer includes a building having an exterior wall, the above-ground control cabinet is mountable on the exterior wall.

8. A system as defined in claim 1, further comprising lock means for controlling access to the above-ground cabinet.

9. A system as defined in claim 1, wherein the valve activation control means includes a first communications portion and the underground valve activation means includes a second communications portion, the first and second communications portions operable to establish a data link there between.

10. A system as defined in claim 9 wherein the first and second communications portions are operable under an R3485 signal transmission protocol.

11. A system as defined in claim 10 wherein the valve activation control means includes a portable housing.

12. A system as defined in claim 11 wherein the valve activation control means includes one or more batteries contained in the housing, for powering the valve activation control means.

13. A system as defined in claim 1, wherein the underground valve means includes a drive motor and a valve housing, the valve housing having a first inlet and a first outlet and a channel there between, the valve housing containing a valve clement movable between an open position and a closed position, respectively to open or close the channel.

14. A system as defined in claim 13 wherein the motor has a drive axle which is powered unidirectionally and the valve element is movable between the closed and open positions under the action of the motor travelling at least a portion of one rotation.

15. A system as defined in claim 13 wherein the activation signal includes a data component representative of a target position for the valve element.

16. A system as defined in claim 15, further comprising detection means for detecting the position of the motor axle in order to determine the current position of the valve clement.

17. A system as defined in claim 1 wherein the detection means includes a limit switch to detect the transition of the valve trough at least two of the North, West, South and East positions.

18. A system as defined in claim 17 wherein the limit switch moves from a low condition to a high condition when the valve moves from a closed position to an open position, and from a high condition to a low condition when the valve moves from the open position to the closed position.

19. A system as defined in claim 18 wherein the detection means is operable, when responding to an activation signal to open the valve, to detect a transition of the limit switch from a low condition to a high condition.

20. A system as defined in claim 18 wherein the detection means is operable, when responding to an actuation signal to close the valve, to detect a transition of the limit switch from a high condition to a low condition.

21. A system as defined in claim 18, further comprising memory means for storing limit switch transition data representative of a last known state of the limit switch.

22. A system as defined in claim 21 wherein the detection means is operable to access the transition data from the memory means.

23. A method of controlling a municipal water supply, of the type having an underground water main, at least one water consumer station downstream from the water main, an underground water delivery channel joining the water main to the water consumer and an underground valve for controlling the passage of water to the water consumer, comprising the steps of providing an underground valve activator which is responsive to an activation signal for activating the underground water valve between closed condition and an open condition, providing a valve activation controller for issuing the activation signal; and providing a data channel between the valve activation controller and the valve activator to deliver the activation signal thereto to the underground water valve means, wherein the step of providing an underground valve activator includes the steps of providing a unidirectional drive motor and a valve housing with a first inlet and first outlet and a channel there between, locating a valve element in the housing which is movable between an open position and a closed position, respectively to open or close the channel, and powering the drive motor so that the valve element is movable between the closed and open positions under the action of the motor travelling at least a portion of one rotation, further comprising the step of configuring the activation signal to include a data component representative of a target position for the valve element.

24. A method as defined in claim 23, further comprising the step of providing a detector unit for detecting the position of the motor axle in order to determine the current position of the valve element.

25. A method as defined in claim 24, further comprising the step of providing a comparator unit for comparing the target position with the current position.

26. A method as defined in claim 25, wherein the step of providing a comparator unit includes providing a limit switch to detect the transition of the valve through at least two of the North, West, South and East positions.

27. A method as defined in claim 26, wherein the step of providing a limit switch includes the step of configuring the limit switch to moves from a low condition to a high condition when the valve moves from a closed position to an open position) and from a high condition to a low condition when the valve moves from the open position to the closed position.

28. A method as defined in claim 23, wherein the step of providing a data channel includes the step of providing the valve activation controller with a first communications portion and the underground valve activator with a second communications portion, the first and second communications portions operable to establish a data link there between.

29. A method as defined in claim 28, further comprising the step of establishing an RS485 signal transmission protocol between the first and second communications portions.

* * * * *